United States Patent [19]
Dillard

[11] 3,890,349
[45] June 17, 1975

[54] 5,5-DIALKYL-3-PYRROLINE-2,2-DICARBOXYLIC ACID ESTERS
[75] Inventor: Robert D. Dillard, Zionsville, Ind.
[73] Assignee: Eli Lilly and Company, Indianapolis, Ind.
[22] Filed: Dec. 20, 1973
[21] Appl. No.: 426,859

[52] U.S. Cl............................. 260/326.46; 424/274
[51] Int. Cl............................................ C07d 27/14
[58] Field of Search................................ 260/326.46

[56] References Cited
UNITED STATES PATENTS
3,185,705   5/1965   Leonard et al. ............... 260/326.46

Primary Examiner—Joseph A. Narcavage
Attorney, Agent, or Firm—William E. Maycock; Everet F. Smith

[57] ABSTRACT 5,5-Dialkyl-3-pyrroline-2,2-dicarboxylic acid esters, useful as plant fungicides and anti-inflammatory agents, are prepared either by reacting an ethynylalkylamine with a bromomalonic ester or by heating a 2-amino-2-allenylmalonic ester with copper metal.

4 Claims, No Drawings

5,5-DIALKYL-3-PYRROLINE-2,2-DICARBOXYLIC ACID ESTERS

BACKGROUND OF THE INVENTION

This invention relates to 5,5-dialkyl-3-pyrroline-2,2-dicarboxylic acid esters. More particularly, this invention relates to 5,5-dialkyl-3-pyrroline-2,2-dicarboxylic acid esters which are useful as plant soil fungicides and/or antil-inflammatory agents.

Ornamental plants, food crops, and turf annually are severely damaged by many types of soil-borne and airborne fungi. For example, fungi which occur in the soil can have a deleterious effect on germinating and growing plants. In many instances, the germination of seeds planted in fungus-infected soil is prevented entirely; even where germination occurs, the resulting seedlings often do not develop into healthy plants. Organisms affecting plants in this latter manner are known as seedling blight or damping-off fungi. Such fungi can be inhibited either by treatment of the soil wherein the seeds are to be planted or, in some instances, by direct treatment of the seeds themselves.

Anti-inflammatory agents frequently are prescribed in clinical cases of arthritis which generally is an affliction of the older segment of the population. In fact, persons over the age of about 70 almost invariably suffer from clinically-diagnosed arthritis. Consequently, there is a continuing search for anti-inflammatory agents.

SUMMARY OF THE INVENTION

It therefore is an object of the present invention to provide novel 5,5-dialkyl-3-pyrroline-2,2-dicarboxylic acid esters which are useful as plant soil fungicides and/or anti-inflammatory agents.

This and other objects will be apparent to those skilled in the art from a consideration of the specification and claims which follow.

The compounds provided by the present invention are novel 5,5-dialkyl-3-pyrroline-2,2-dicarboxylic acid esters having the following general formula:

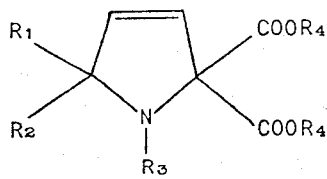

wherein
  $R_1$ and $R_2$ are independently-selected monovalent $C_1$–$C_3$ alkyl groups, or $R_1$ and $R_2$ taken together constitute a divalent polymethylene group having either four or five carbon atoms which, together with the carbon atom to which it is attached, completes a five-or six-membered carbocyclic ring;
  $R_3$ is a monovalent $C_1$–$C_3$ alkyl group; and
  $R_4$ is a monovalent $C_1$–$C_6$ alkyl group.

The compounds of the present invention are prepared either by reacting an ethynylaklylamine with a bromomalonic ester in acetonitrile and in the presence of sodium bicarbonate, lithium carbonate, or excess ethynylalkylamine, or by heating a 2-amino-2-allenylmalonic ester in the presence of copper metal.

DETAILED DESCRIPTION OF THE INVENTION

The term "$C_1$–$C_3$ alkyl" as used in this specification represents the following groups: methyl, ethyl, n-propyl, and isopropyl. When $R_1$ and $R_2$ together constitute a polymethylene group, there is formed with the carbon atom of attachment either a cyclopentyl ring or a cyclohexyl ring.

Preferably, $R_1$ and $R_2$ are methyl or $R_1$ and $R_2$ together constitute a pentamethylene group, and $R_3$ is methyl. Thus, the preferred compounds are 1,5,5-trimethyl-3-pyrroline-2,2-dicarboxylic acid esters and 5,5-pentamethylene-1-methyl-3-pyrroline-2,2-dicarboxylic acid esters. The most preferred compounds are those wherein $R_4$ is ethyl, i.e., diethyl 1,5,5-trimethyl-3-pyrroline-2,2-dicarboxylate and diethyl 5,5-pentamethylene-1-methyl-3-pyrroline-2,2-dicarboxylate.

The compounds of the present invention have been shown by suitable tests to be effective against such soil fungi as *Rhizoctonia solani*, the organism responsible for damping-off in cotton, and *Pythium aphanidermatum*, the organism responsible for pythium damping-off in cotton. The compounds also are active anti-inflammatory agents.

When employed as soil fungicides, the compounds of the present invention can be applied to the soil according to methods well known in the art. The compounds can be applied to the soil either directly or after dilution with various inert solid or liquid materials, as described hereinbelow. Usually, the fungicidal compounds or compositions are allowed to remain as a coating on the surface of this soil. However, such compounds or compositions can be incorporated into the soil by discing, hoeing, or other methods well known to those skilled in the art.

In general, the compounds of the present invention are utilized in effective amounts, which amounts will vary somewhat with the particular fungus to be treated, the severity of the infection, the manner of treatment, and other factors such as the environment in which treatment is conducted. The compounds of the present invention normally will be employed at levels of from about 1 to about 20 lbs./acre, and preferably from about 1 to about 5 lbs./acre.

As indicated hereinabove, the compounds of the present invention can be used directly or they can be diluted with various inert solid or liquid materials. Such inert solid or liquid materials include, among others, water, polyhydroxy compounds, petroleum distillates, and other dispersion media, surface active dispersing agents and emulsifiers, and finely divided inert solids. When such diluents are employed, the concentration of a fungicidal compound disclosed in the present invention can vary depending upon whether the composition is intended to be used in an emulsifiable concentrate or as a wettable powder designed to be subsequently diluted with additional inert carriers, such as water, to produce the ultimate treating composition, or is intended for direct application as a dust.

Frequently, treating compositions are most conveniently formulated by preparing liquid or solid concentrates which subsequently are diluted to the desired level for use. Emulsifiable liquid concentrates can be prepared by incorporating from about 1 to about 10 percent by weight of the fungicidal component with an emulsifying agent in a suitable water-immiscible organic liquid. Such concentrates may be further diluted with water to form spray mixtures in the form of oil-in-water emulsions. Such spray compositions then comprise active toxicant, water-immiscible solvent, emulsifying agent, and water. Suitable emulsifying agents can be of the nonionic or ionic types, or blends thereof, and include condensation products of alkylene oxides with phenols and organic acids, polyoxyethylene derivatives of sorbitan esters, complex ether'alcohols, ionics of the arylalkyl sulfonate type, and the like. Suitable water-immiscible organic liquids which can be employed include aromatic hydrocarbons, aliphatic hydrocarbons, cycloaliphatic hydrocarbons, and mixtures thereof, such as petroleum distillate.

Solid concentrate mixtures can be prepared by incorporating from about 10 to about 50 percent by weight of a fungicidal compound of the present invention in a finely divided inert solid carrier such as bentonite, Fuller's earth, diatomaceous earth, hydrated silica, diatomaceous silica, expanded mica, talc, chalk, and the like. Such concentrates can be formulated, if desired, for direct use as dusting compositions, or can be diluted, if desired, with additional inert solid carriers to produce dusting powders containing from about 2 to about 5 percent by weight of the fungicidal component. Alternatively, surfactants, that is, dispersing and/or wetting agents, can be incorporated along with the fungicidal compound in the solid carrier to form wettable powder concentrates containing from about 10 to about 90 percent by weight concentration of fungicidal compound, which composition subsequently can be dispersed in water or other hydroxylated carrier to form spray compositions. such spray compositions typically contain from about 0.1 to about 1.0 percent by weight of fungicidal compound. Suitable surfactants include condensed aryl sulfonic acids and sodium salts thereof, sodium lignosulfate, sulfonate-oxide condensate blends, alkylarylpolyether alcohols, sulfonated nonionic blends, anionic wetting agents, and the like.

Furthermore, the fungicidal compounds of the present invention can be incorporated into solutions, simple dispersions, aerosol formulations, and other media suitable for applying to the soil by methods known to those skilled in the art.

When employed as anti-inflammatory agents, the compounds of the present invention are administered to warm-blooded animals in effective amounts; typical dosages are in the range of from about 10 to about 100 mg./kg. of animal body weight. The compounds can be administered orally, parenterally, or by other means known to those skilled in the art. Preferably, when utilized as anti-inflammatory agents, the compounds of the present invention are employed in combination with one or more adjuvants suited to the particular route of administration. Thus, in the case of oral administration, the compound is modified with pharmaceutical diluents or carriers, such as lactose, sucrose, starch powder, cellulose, talc, magnesium stearate, magnesium oxide, calcium sulfate, acacia powder, gelatin, sodium alignate, sodium benzoate, and stearic acid. Such compositions can be formulated as tablets or enclosed in capsules for convenient administration. The compounds can also be mixed with a liquid and administered as elixirs, suspensions, and the like. In the case of parenteral administration, the compound to be used is conveniently formulated in saline to constitute an injectable liquid solution. Other adjuvants and modes of administration are known to those skilled in the art. If desired, the pharmaceutical preparations may contain, in addition to the active component of the present invention, one or more other pharmacologically-active substances, for example, acetylsalicylic acid, α-d-propoxyphene, caffeine, or acetaminophen (N-acetyl-p-aminophenol).

The compounds of the present invention can be prepared by reacting an ethynylalkylamine with a bromomalonic ester in acetonitrile and in the presence of sodium bicarbonate, lithium carbonate, or excess ethynylalkylamine. In general, the suitable ethynylalkylamines are represented by the following general formula:

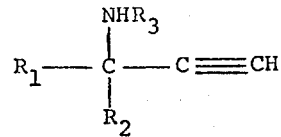

wherein $R_1$, $R_2$, and $R_3$ are as defined hereinbefore.

Examples of suitable ethynylalkylamines include, among others, 3-methyl-3-methylamino-1-butyne; 3,4-dimethyl-3-ethylamino-1-pentyne; 3-ethyl-3-methylamino-1-pentyne; 3-methyl-3-isopropylamino-1-pentyne; 3-isopropyl-4-methyl-3-ethylamino-1-pentyne. The preferred ethynylaklylamines are 3-methyl-3-methylamino-1-butyne and 1-ethylnyl11-methylaminocyclohexane.

The ethynylalkylamines are readily prepared by the procedure of N. R. Easton, et al., J. Org. Chem., 26, 3772 (1961) (see also U.S. Pat. No. 3,285,913), which procedure involves the reaction of an acetylenic halide with an amine.

The suitable bromomalonic esters can be represented by the following general formula:

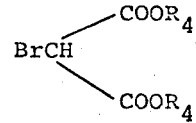

wherein R is as defined hereinbefore.

Examples of suitable bromomalonic esters include, among others, dimethyl bromomalonate, diethyl bromomalonate, di-n-propyl bromomalonate, diisopropyl bromomalonate, di-n-butyl bromomalonate, diisobutyl bromomalonate, di-sec-butyl bromomalonate, di-t-butyl bromomalonate, di-n-pentyl bromomalonate, di-neo-pentyl bromomalonate, diisohexyl bromomalonate, and the like. The preferred bromomalonic esters are dimethyl bromomalonate and diethyl bromomalonate. The most preferred ester is diethyl bromomalonate.

The mole ratio of ethynylalkylamine to bromomalonic ester can range from about 1:1 to about 5:1. Preferably, this molar ratio will be within the range of from about 1:1 to about 2.5:1; the most preferred molar ratio is 1.5:1.

As stated hereinbefore, the reaction of the ethynylalkylamine with the bromomalonic ester is carried out in acetonitrile. In general, the amount of acetonitrile employed is not critical. Typically, the amount of acetonitrile will be at least 50 percent of the total amount of reactants and solvents combined. Often, however, the solvent will constitute about 75 percent of the total reaction mixture.

It perhaps should be pointed out that, depending upon the ethynylalkylamine and bromomalonic ester to be employed, aliphatic nitriles other than acetonitrile, such as butyronitrile, often can be employed as solvents. However, such solvents generally are less satisfactory than acetonitrile. Furthermore, the usual organic solvents, such as ethanol and benzene, are disfavored because of the pronounced tendency of a bromomalonic ester to couple with itself in these solvents.

As stated hereinbefore, the reaction of the ethynylalkylamine with the bromomalonic ester requires the presence of sodium bicarbonate, lithium carbonate, or excess ethynylalkylamine as an acid scavenger, with excess ethynylalkylamine being preferred. Because each mole of bromomalonic ester generates one mole of hydrobromic acid, the acid scavenger should be employed in at least an equivalent amount. That is, the molar ratio of acid scavenger to bromomalonic ester should be at least about 1:1. Preferably, an excess of acid scavenger will be employed. Thus, the preferred molar ratio of acid scavenger to bromomalonic ester is in the range of from about 1:1 to about 3:1 or higher.

Withuot wishing to be bound by a particular mechanism of reaction, it is believed that the reaction of an ethynylalkylamine with a bromomalonic ester proceeds through formation of an acetylenic intermediate as shown by equation (1):

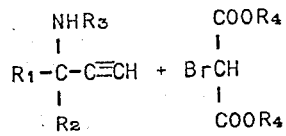
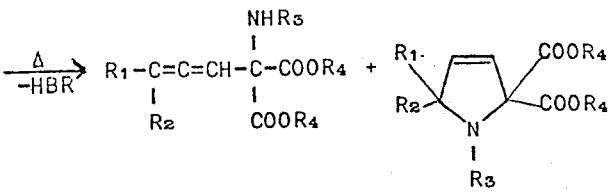

ucts of the reaction are a 2-amino-2-allenylmalonic ester and a 3-pyrroline-2,2-dicarboxylic acid ester which probably results from the cyclization of the allenylmalonic ester, as shown by equation (2)

The amounts of allenylmalonic ester and pyrroline compound obtained in general are dependent upon the substituents present on the ethynylalkylamine, reaction time and temperature, and the acid scavenger employed. Thus, as steric hindrance increases, i.e., as the bulk of $R_1$, $R_2$, or $R_3$ increases, the amount of pyrroline compound obtained decreases. Increased reaction times and/or higher reaction temperatures tend to increase the amount of pyrroline compound obtained. Furthermore, the use of excess ethynylalkylamine as acid scavenger favors formation of pyrroline compound; the formation of allenylmalonic ester is favored by using sodium bicarbonate as acid scavenger. Interestingly, copper metal inhibits conversion of the intermediate to allenylmalonic ester, but catalyzes the conversion of allenylmalonic ester to pyrroline compound.

The reaction temperature employed in carrying out the preparation of pyrroline compound according to equation (2) normally is the reflux temperature at atmospheric pressure of acetonitrile. Clearly, the reaction temperature employed must be below the decomposition temperatures of the reactants employed. Usually, the reaction temperature will be below about 100°C., preferably, the reaction temperature will be below about 85°C. While not preferred, higher temperatures can be employed through the use of superatmospheric pressure. Conversely, lower temperatures can be employed by carrying the reaction out under subatmospheric pressure.

As with most chemical reactions, the reaction time is to a large extent dependent upon the reaction temperature. At higher reaction temperatures, shorter reaction times can be employed. Generally, the reaction times will be in the range of from about 24 to about 120 hours. The preferred reaction times are from about 72 to about 96 hours.

Heating the intermediate also give allenylmalonic ester and pyrroline compound, as shown by equation (3),

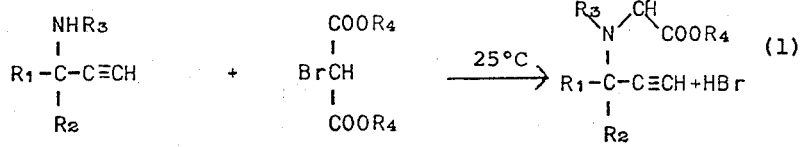
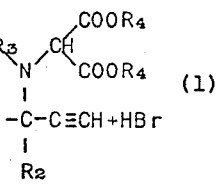
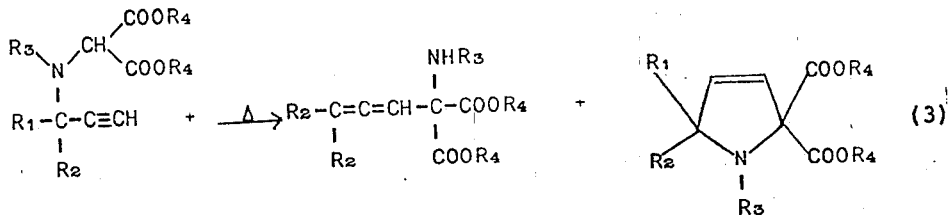

wherein $R_1$, $R_2$, $R_3$, and $R_4$ are as defined hereinbefore.

The intermediate generally is sensitive to both heat and acid. However, the intermediate usually is obtained when the reaction is carried out at ambient temperature, e.g., about 25°C., for extended periods of time, e.g., 1-2 weeks. Isolation of the intermediate usually is accomplished by distilling the reaction mixture (usually after extraction with benzene, washing the benzene extract with water, and drying) under reduced pressure in the presence of copper metal which inhibits rearrangement of the intermediate.

If an ethynylalkylamine and a bromomalonic ester are heated at an elevated temperature (in acetonitrile and in the presence of an acid scavenger), the intermediate is not obtained; under these conditions the prodalthough normally the intermediate is not isolated and the pyrroline compound is prepared as shown by equation (2).

When preparing the pyrroline compound by the reaction of equation (3), the temperature is maintained at a relatively high level, but below the decomposition temperatures of the intermediate and pyrroline compound. In general, higher temperatures favor formation of pyrroline compound. The reaction temperature often will be within the range of from about 50° to about 150°C. above the boiling point of pyrroline compound (under reduced pressure). Typically, the intermediate is vacuum-distilled to give a mixture of allenylmalonic ester and pyrroline compound, which mixture generally can be fractionated either during or subsequent to the distillation procedure.

As stated hereinbefore, the pyrroline compound also can be prepared by heating allenylmalonic ester in the presence of copper metal. The procedure essentially is that described for the preparation of pyrroline compound from the intermediate, except that the distillation is carried out in the presence of copper metal. In general, the amount of copper (usually in powder form) employed will be in the range of from about 1 to about 10 percent by weight, based on the amount of allenylmalonic ester.

Upon completion of the reaction, the reaction mixture is worked-up by methods well known to those skilled in the art. For example, the reaction mixture is allowed to cool, washed with water, and then extracted with excess 10 percent aqueous hydrochloric acid. The aqueous acidic solution then is made strongly basic with 50 percent sodium hydroxide and extracted with ether. The ether extract is dried over a suitable drying agent, such as anhydrous magnesium sulfate, decanted from the drying agent, and distilled at reduced pressure.

The present invention is further described, but not limited, by the following examples which illustrate certain preferred embodiments. Unless otherwise stated, all temperatures are in °C.

EXAMPLE 1

A mixture of 58.2 g. of 3-methyl-3-methylamino-1-butyne, 57.5 g. of diethyl bromomalonate, and 250 ml. of acetonitrile was heated at reflux for 4 days. After cooling, the mixture was washed with water, and then extracted with excess 10 percent hydrochloric acid. The aqueous acidic solution was made strongly alkaline with 50 percent sodium hydroxide and extracted with ether. The ether solution was dried over anhydrous magnesium sulfate, decanted from the drying agent, and distilled at reduced pressure. The fraction boiling at 113°–114°/4.0 mm. was collected to give 22.6 g. (37 percent) of diethyl 1,5,5-trimethyl-3-pyrroline-2,2-dicarboxylate. The following analytical data were obtained:

Calculated for $C_{13}H_{21}NO_4$:
C, 61.15; H, 8.29; H, 5.49.
Found: C, 61.05; H, 8.44; N, 5.55.

EXAMPLE 2

A mixture of 20.6 g. of N-methyl-1-ethynylcyclohexylamine, 23.0 g. of diethyl bromomalonate, 8.4 g. of sodium bicarbonate, and 200 ml. of acetonitrile was heated at reflux for three days. After cooling, the mixture was washed with water, and then extracted with excess 10 percent hydrochloric acid. The aqueous acidic solution was made strongly alkaline with 50 percent aqueous sodium hydroxide, and then extracted with ether. The ether solution was dried over anhydrous magnesium sulfate, decanted from the drying agent, and distilled at reduced pressure. The fraction boiling at 113°–115°/0.05 mm. was collected to give 14.4 g. (50 percent yield) of diethyl 2-(cyclohexylidenevinyl)-2-methylaminomalonate. The following analytical data were obtained:

Calculated for $C_{16}H_{25}NO_4$:
C, 65.06; H, 8.53; N, 4.74.
Found: C, 64.91; H, 8.62; N, 5.00.

EXAMPLE 3

Diethyl 2-(cyclohexylidinevinyl)-2-methylaminomalonate, 7 g., was vacuum-distilled in the presence of 0.5 g. of copper powder to give 4.7 g. (67 percent) of diethyl 5,5-pentamethylene-1-methyl-3-pyrroline-2,2-dicarboxylate, b.p. 102°–106°/0.2 mm. The following analytical data were obtained:

Calculated for $C_{16}H_{25}NO_4$:
C, 65.06; H, 8.53; N, 4.74.
Found: C, 64.78; H, 8.63; N, 4.56.

What is claimed is:
1. A compound of the following general formula:

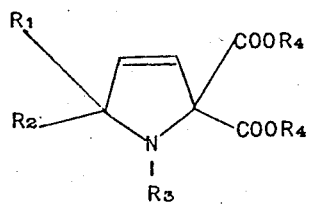

wherein
$R_1$ and $R_2$ are independently selected monovalent $C_1$–$C_3$ alkyl groups, or $R_1$ and $R_2$ taken together constitute a divalent polymethylene group having either four or five carbon atoms which, together with the carbon atom to which it is attached, completes a five- or six-membered carbocyclic ring;
$R_3$ is a monovalent $C_1$–$C_3$ alkyl group; and
$R_4$ is a monovalent $C_1$–$C_6$ alkyl group.
2. The compound of claim 1, wherein $R_1$ and $R_2$ taken together constitute a pentamethylene group.
3. Diethyl 1,1,5-trimethyl-3-pyrroline-2,2-dicarboxylate
4. Diethyl 5,5-pentamethylene-1-methyl-3-pyrroline-2,2-dicarboxylate.

* * * * *